United States Patent [19]
Wang et al.

[11] Patent Number: 5,745,612
[45] Date of Patent: Apr. 28, 1998

[54] WAVELENGTH SORTER AND ITS APPLICATION TO PLANARIZED DYNAMIC WAVELENGTH ROUTING

[75] Inventors: Weyl-Kuo Wang; Franklin Fuk-Kay Tong, both of Stamford, Conn.; Karen Liu, Montclair, N.J.

[73] Assignee: International Business Machines Corporation, Armonk, N.Y.

[21] Appl. No.: 574,474

[22] Filed: Dec. 18, 1995

[51] Int. Cl.$^6$ .................................................. G02B 6/28
[52] U.S. Cl. ........................... 385/24; 385/37; 385/46; 359/130
[58] Field of Search .......................... 385/24, 27, 37, 385/39, 46; 359/113, 114, 124, 127, 130

[56] References Cited

U.S. PATENT DOCUMENTS

5,488,500   1/1996   Glance ........................................ 385/24

*Primary Examiner*—Phan T. H. Palmer
*Attorney, Agent, or Firm*—Perman & Green, LLP

[57] ABSTRACT

This invention provides methods and apparatus for achieving wavelength sorting multiplexer/demultiplexer and its application to the implementation of planarized dynamic wavelength routing. Using integrated arrayed-waveguide gratings, sorting can be achieved by two configurations. In the first configuration channel wavelengths are properly selected and launched into prearranged input waveguides of an arrayed-waveguide grating such that channels at the same wavelength and from all inputs will be demultiplexed and routed to adjacent outputs. Operated in the reverse direction, the same device becomes a sorting multiplexer. The second configuration achieves wavelength sorting by using the cascade of multiple arrayed-waveguide gratings and can also be operated as a demultiplexer or a multiplexer. Combined with space switches, the wavelength sorting multi/demultiplexer are utilized to implement the planarized channel-selective dynamic wavelength router. The function of wavelength sorting eliminates on-chip waveguide crossings and therefore reduces losses and crosstalks. The sorting demultiplexer and multiplexer can further be implemented with a single arrayed-waveguide grating.

18 Claims, 7 Drawing Sheets

WAVELENGTH SORTER AND ITS APPLICATION TO PLANARIZED DYNAMIC WAVELENGTH ROUTING

TECHNICAL FIELD

This invention relates to optical communication networks utilizing the technique of wavelength-division multiplexing.

BACKGROUND OF THE INVENTION

Channel-selective dynamic wavelength routing is a key function for all-optical networks which utilize the wavelength-division multiplexing (WDM) technique (See, for example, S. Alexander et al., Journal of Lightwave Technology, vol. 11, no. 5/6, pp. 714–735, 1993). A systematic diagram for realizing such a dynamic multi-wavelength routing network generally consists of the cascade of an input demultiplexing section, an intermediate space switch section, and an output multiplexing section. Each of the input demultiplexers separates various wavelength channels in one of the input fibers into various spatial positions. Channels at the same wavelength from all the input fibers are then fed into one of the intermediate space switches. The outputs of each space switch are individually connected to different multiplexers in the output multiplexing section. The internal switching states of the space switches are controlled according to the network routing instructions, which therefore achieve the overall required dynamic channel-selective wavelength routing between all wavelength channels in the input fibers.

One promising scheme to perform the multiplexing and demultiplexing functions as described above is to employ the integrated array-waveguide grating, for which a review of recent progress is given by B. H. Verbeek and M. K. Smit (Digest, 1995 European Conference on Optical Communication, pp. 195–202). The arrayed-waveguide grating has been successfully implemented in various material systems including silica glasses, III-V semiconductors like InP, and polymers. The arrayed-waveguide grating typically consists of multiple input and output waveguides, and the input and output slab regions connected by multiple arrayed waveguides. Light at different wavelength channels from any of the input waveguides diffracts in the input slab and is captured by the arrayed waveguides. The lengths of the arrayed waveguides are designed to introduce wavelength-dependent incremental phase delays to provide a converging beam through the output slab at different directions for different wavelengths. The various wavelength channels are thus spatially separated and coupled to various output waveguides, which achieves the demultiplexing function. By reciprocity, when operated in the reverse direction, the arrayed-waveguide also performs the multiplexing function.

Full utilization of the multiple inputs and outputs of the arrayed-waveguide grating results in N×N interconnections between N input fibers and N output fibers (see, for example, Dragone, IEEE Photonics Technology Letters, pp. 896–899, October 1991), as well as the wavelength channel add/drop multi/demultiplexer. The latter arrangement, as first proposed by Y. Tachikawa et al. (Electronics Letters, vol. 29, no. 24, pp. 2133–2134, 1993), involves one input fiber, one output fiber, and a 16×16 arrayed-waveguide grating in which all but the center output waveguides are looped back to their corresponding inputs through external fibers. By opening the external fibers, up to 15 wavelength channels can be dropped and added.

The idea of using a single arrayed-waveguide grating and space switches for performing dynamic channel-selective wavelength routing between multiple input fibers and multiple output fibers was reported by S. Suzuki et al. (Electronics Letters, vol. 30, no. 13, pp. 1091–1092, 1994). For F input fibers and F output fibers with W wavelength channels in each fibers, the dynamic routing function can be achieved by an N×N arrayed-waveguide grating with $N \geq F$ (W+1) and a W array of F×F space switches. The loop-back paths were, however, still done by using external fibers. This configuration will be referred to in the following as an W-channel F×F dynamic wavelength router. When F=2 with one input and one output utilized as the add and the drop ports, respectively, it is also referred to as a W-channel optical add/drop multiplexer in the literature.

A fully integrated 16-channel optical add/drop multiplexer was reported by K. Okamoto et al. (1995 Optical Fiber Communication Conference, paper PD10-2) using 3 arrayed-waveguide gratings integrated with 16 Mach-Zehnder type thermo-optic 2×2 switches. The device fiber-to-fiber insertion losses were about 6–8 dB for signals routed from the main input port to the main output port or to the drop port, and 3–4 dB from the add port to the main output port. The worst-case crosstalk was −13 dB. Because the space switches were integrated with the multiplexer and demultiplexer, such a design represents an example of planarized implementation of the dynamic wavelength router which avoids external interconnecting fibers between the multi/demultiplexer and the array switches. The on-chip waveguide crossings (or overlappings) are, however, still an problem which, as F and W increase, greatly complicates the waveguide layout while at the same time introduces extra losses, loss nonuniformity, and crosstalks.

SUMMARY OF THE INVENTION

An object of this invention is to provide means for achieving the function of wavelength sorting by using the arrayed-waveguide grating(s) with non-crossing and non-overlapping on-chip waveguides. A further object of this invention is to provide a planarized realization of a channel-selective dynamic wavelength router incorporating the function of wavelength sorting.

The preferred embodiment of the present invention provides means for realizing a wavelength sorting multiplexer/demultiplexer and its application to the implementation of a planarized dynamic wavelength router. Using the arrayed-waveguide grating (AWG), the sorting function can be achieved by two configurations. In the first configuration the WDM channel wavelengths are properly selected such that, when launched into prearranged input waveguides of the AWG, channels at the same wavelength and from all inputs will be routed to adjacent outputs, which therefore achieves the function of a sorting demultiplexer. By reversing the direction of flow of optical signals, the same arrangement becomes a sorting multiplexer. The second configuration achieves wavelength sorting by using the cascade of multiple AWGs with a different scheme of selecting channel wavelengths and can also be operated as a demultiplexer or as a multiplexer. Both configurations can accommodate the scalability of wavelength sorting and thus allow future increase in network capacity with no need to modify the configuration.

By incorporating the wavelength sorting multi/demultiplexer of the present invention and using an array of space switches, the dynamic wavelength router can be implemented in a planarized fashion free of external interconnecting fibers. The achieved wavelength sorting completely eliminates on-chip waveguide crossing (or overlapping) and therefore reduces signal losses and crosstalks. The planarized dynamic wavelength router is implemented when the switch array is either integrated with the sorting multi/demultiplexer or connected through direct waveguide-to-waveguide butt coupling. The sorting demultiplexer and multiplexer can further be implemented with a single AWG.

DESCRIPTION OF THE PREFERRED EMBODIMENT

Figure 1A:
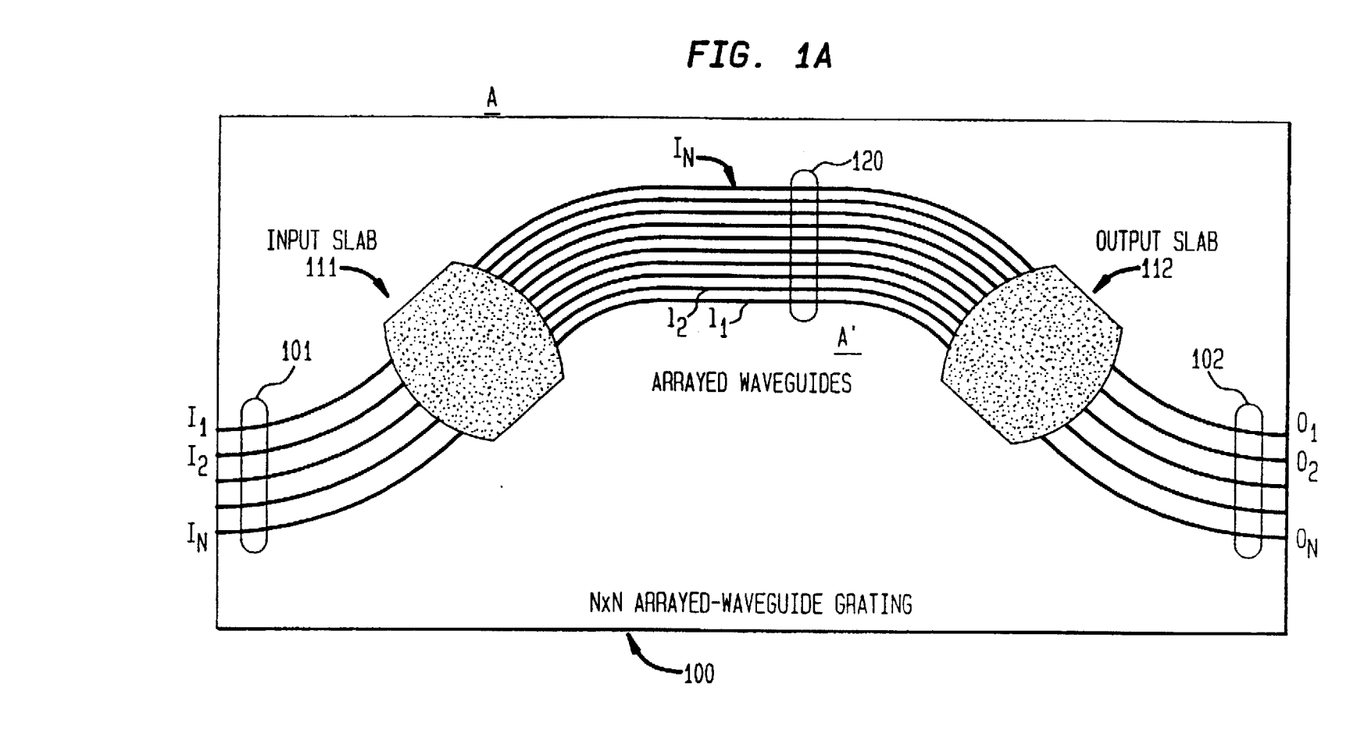
FIG. 1(a) schematically illustrates the waveguide structure of a typical arrayed-waveguide grating.

The integrated waveguide structure of a typical N×N AWG is schematically illustrated in FIG. 1(a) fabricated on a substrate 100. There are N input waveguides 101 (denoted by $I_1, I_2, \ldots, I_N$) and N output waveguides 102 (denoted by $O_1, O_2, \ldots, O_N$). Wavelength channels launched into $I_i$ through the input fiber are guided and directed to the input slab 111. The diffracted light in 111 is captured by a plurality of arrayed waveguides 120 of an incremental length difference $\Delta L = l_{k+1} - l_k$, which are then connected to the output slab 112. This arrangement results in a phased array antennas radiating in the slab 112. $\Delta L$ can be selected such that a particular wavelength channel $\lambda_0$ will be routed from $I_i$ to $O_j$ for specific i and j. The AWG structural parameters can be designed such that if $\lambda_0$ is routed from $I_i$ to $O_j$, then $\lambda_0$ will also be routed from $I_{i+1}$ to $O_{j-1}$, while $\lambda_0 + \Delta \lambda$ (with $\Delta\lambda > 0$) will be routed from $I_i$ to $O_{j+1}$ if $\Delta L > 0$ or to $O_{j-1}$ if $\Delta L < 0$. Such a rule of input-output wavelength routing can be summarized by If $\lambda_0 : I_i$ to $O_j$ for any i and j, then $\lambda_0 : I_{i+1}$ to $O_{j-1}$ (1)

and $\lambda_0 + \Delta\lambda : I_i$ to $O_{j+1}$ for $\Delta L > 0$ or $I_i$ to $O_{j-1}$ for $\Delta L < 0$ In addition, the wavelength routing is periodical with a period called free spectral range (fsr). $\Delta\lambda$ is the AWG device channel spacing related to other parameters by $$\Delta\lambda = \frac{n_c n_s d^2}{M n_g L_f} \quad (2)$$

where $n_c$, $n_s$, and $n_g$ are the waveguide effective index, the slab effective index, and the group index, respectively. d is the waveguide spacing at the slab boundary, $L_f$ is the slab focal length, and M is the order of the grating. Details of the device operation principle and design method of AWG were discussed, for example, by H. Takahashi et al. (Journal of Lightwave Technology, vol. 13, no. 3, pp. 447–455, March 1995).

Figure 1B:
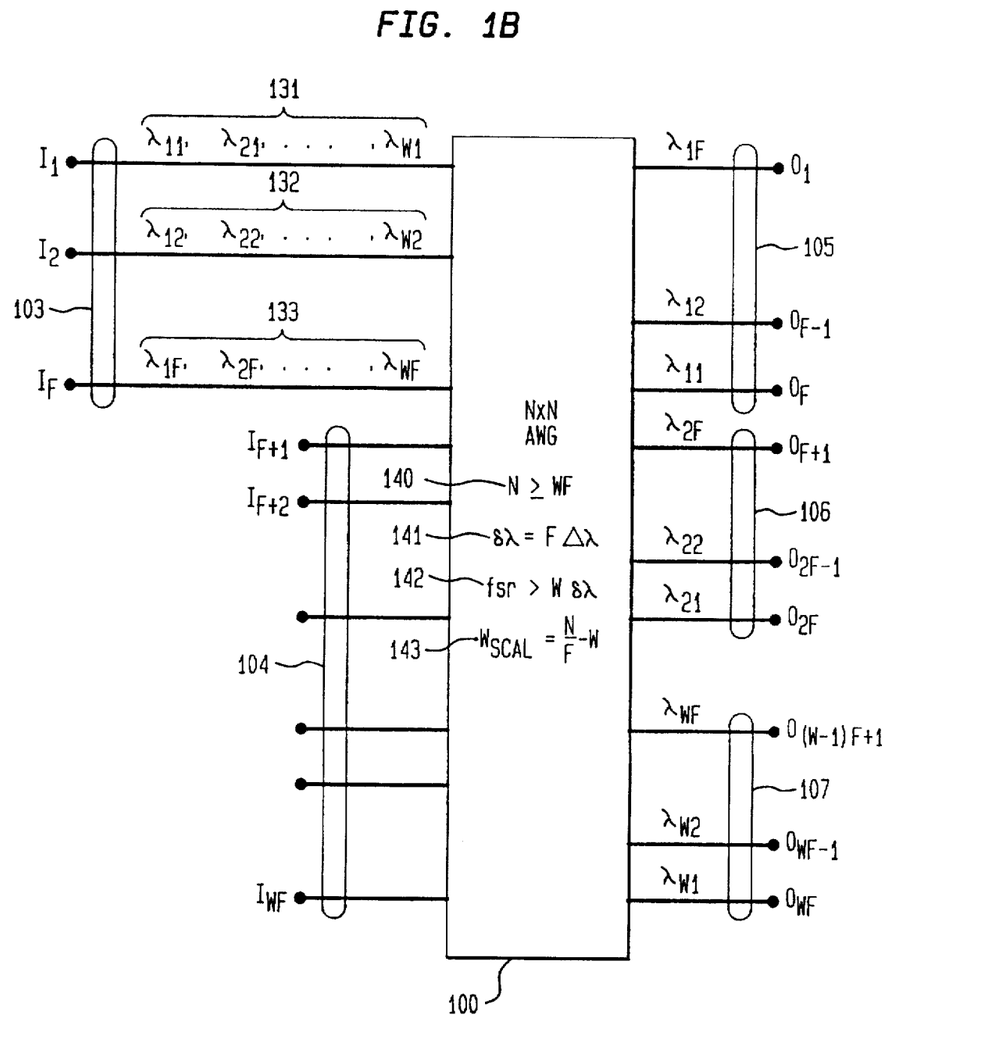
FIG. 1(b) schematically illustrates a wavelength sorter using a single arrayed-waveguide grating.

Based on the properties of wavelength routing in an N×N AWG, the first method for achieving wavelength sorting of the preferred embodiment of this invention is illustrated in FIG. (b) where the N×N AWG is represented by a box 100 which has the internal waveguide structure illustrated by FIG. 1(a). Consider that F incoming fibers are connected to the top F input waveguides 103 and each fiber carries W wavelength-multiplexed channels. Let $\lambda_{ki}$ denote the channel at the wavelength $\lambda_k$, launched into input $I_i$. In other words $(\lambda_{11}, \lambda_{21}, \ldots, \lambda_{W1})$ 131 are launched into $I_1$, $(\lambda_{12}, \lambda_{22}, \ldots, \lambda_{W2})$ 132 into $I_2, \ldots$, and $(\lambda_{1F}, \lambda_{2F}, \ldots, \lambda_{WF})$ 133 into $I_F$. The wavelength spacing $\delta\lambda = \lambda_{k+1} - \lambda_k$ of the W wavelengths is selected as $\delta\lambda = F\Delta\lambda$ 141 with $\Delta\lambda$ given by equation (2). Suppose the AWG 100 is designed to route $\lambda_{11}$ to $O_F$, then according to equation (1), $\lambda_{12}$ will be routed to $O_{F-1}, \lambda_{13}$ (not shown) routed to $O_{F-2}, \ldots$, and $\lambda_{1F}$ routed to $O_1$. All $\lambda_1$ channels are thus routed to adjacent outputs ($O_F, O_{F-1}, \ldots, O_1$) 105. Also according to equation (1) with $\Delta L > 0$, $\lambda_{21}$ will be routed to $O_{2F}$ due to the selection of $\delta\lambda$. The same argument concludes that all $\lambda_2$ channels are routed to adjacent outputs ($O_{2F}, O_{2F-1}, \ldots, O_{F+1}$) 106. The highest wavelengths $\lambda_W$ will then be routed to ($O_{WF}, O_{WF-1}, \ldots, O_{(W-1)F+1}$) 107. Such an arrangement thus functions as a sorting demultiplexer. The required number of input/output waveguides of the AWG should be $N \geq WF$ 141 (actually only F waveguides are used at the input side). In order for the sorting to function properly, the total wavelength span $(\lambda_W - \lambda_1)$ should be less than the AWG fsr so that the routing periodicity has no effect on wavelength sorting, i.e. we require fsr$> W\delta\lambda$ 142. When FIG. 1(b) is operated in the reverse direction, i.e. when sorted wavelength channels, are launched into 100 from the output ports 105, 106, and 107, they will be multiplexed onto 103 due to the reciprocity of AWGs built with passive material. FIG. 1(b) can therefore also be used as a sorting multiplexer. Moreover, if the AWG waveguide structure in FIG. 1(a) is designed symmetric with respect to the plane A—A', the properties of wavelength sorting will also be symmetric. Therefore, FIG. 1(b) can be operated as a sorting demultiplexer in both the forward and the reverse directions, which is also true when used as a sorting multiplexer.

It is evident that the arrangement of FIG. 1(b) with the conditions 140, 141, and 142 will still achieve wavelength sorting when less than F input fibers are connected. Equivalently if we use an AWG with $N = W(F + F_{scal})$, we preserve the possibility of wavelength sorting for additional $F_{scal}$ fibers. In other words the sorting scalability in the number of fibers is $F_{scal}$ 143. Similarly FIG. 1(b) can handle more wavelength channels in the input fibers by using N greater than WF. Specifically, if $N - WF = W_{scal}F$, FIG. 1(b) will still achieve wavelength sorting when each input fiber carries additional $W_{scal}$ wavelength channels. $W_{scal}$ 144 will be referred to as the sorting scalability in the number of wavelength channels.

Figure 2A:
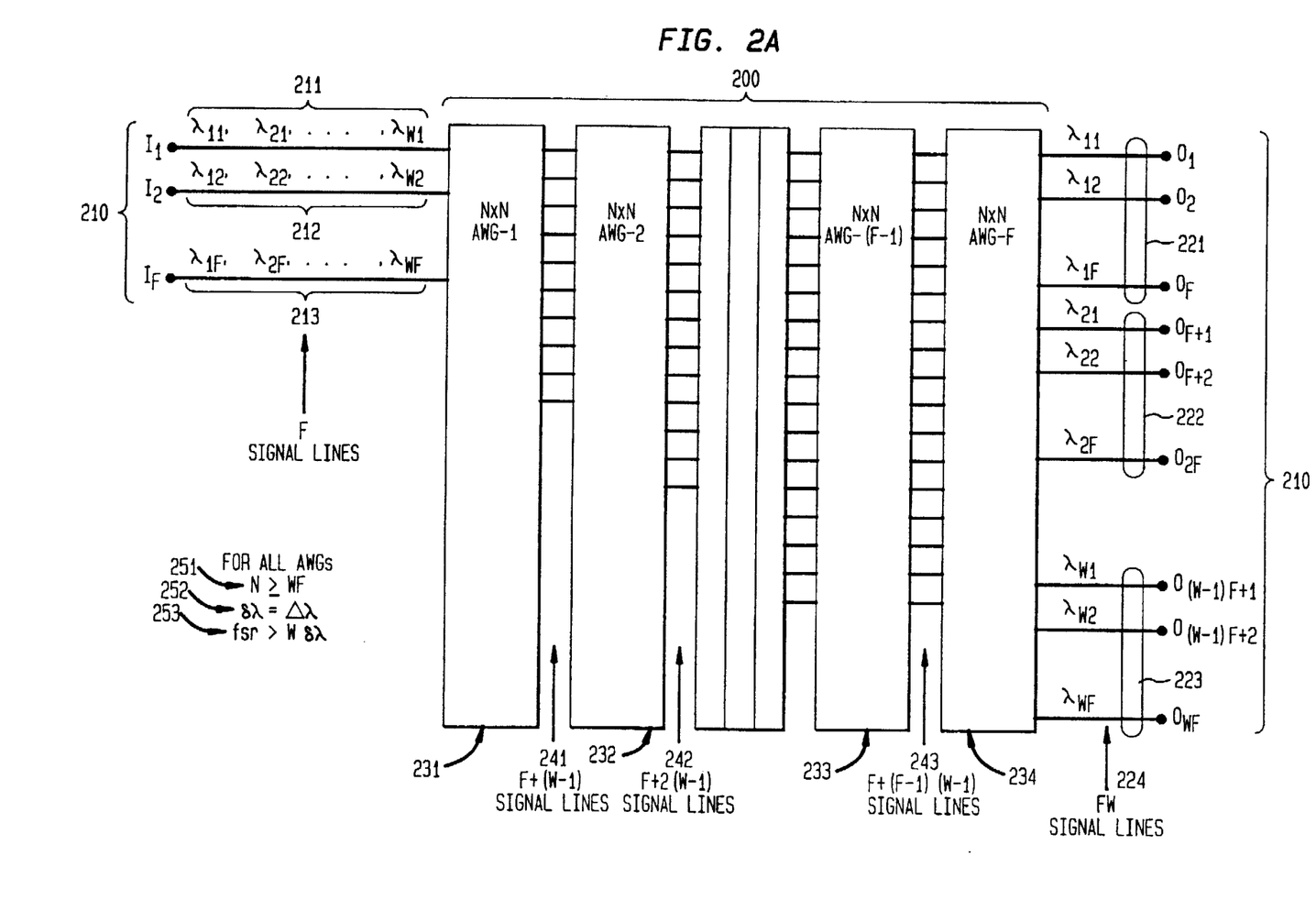
FIG. 2(a) schematically illustrates a wavelength sorter using the cascade of multiple arrayed-waveguide gratings.

The second method for achieving wavelength sorting of the preferred embodiment is schematically illustrated in FIG. 2(a) by using a cascade of F N×N AWGs 200 for F input fibers and W wavelength channels in each fiber. All AWGs satisfy the conditions $N \geq WF$ 251 and fsr $> W\delta\lambda$ 253. The selected W wavelength channels have spacing matched to the AWG device wavelength spacing, i.e. $\delta\lambda = \lambda_{k+1} - \lambda_k = \Delta\lambda$ 252 with $\Delta\lambda$ given by equation (2). Consider the function of sorting demultiplexer first, $(\lambda_{11}, \lambda_{21}, \ldots, \lambda_{W1})$ 211 are launched into input $I_1$, $(\lambda_{12}, \lambda_{22}, \ldots, \lambda_{W2})$ 212 into $I_2, \ldots$, and $(\lambda_{1F}, \ldots, \lambda_{WF})$ 213 into $I_F$. Each of the cascaded AWGs 231, 232, ..., 233, and 234 contributes to a partial sorting according to equation (1). At the outputs of AWG-1 231, there will be F+(W−1) wavelength signal lines 241. When outputs of the first AWG-1 231 are fed into the inputs of AWG-2 232, there will be F+2(W−1) wavelength signal lines 242 at the outputs of 232. This process proceeds such that at the inputs of the last AWG (AWG-F) 234, we have F+(F−1)(W−1) wavelength signal lines 243, and AWG-F 234 completes the required sorting: channels of the same wavelength and from all F input fibers are routed to adjacent output waveguide. The distributions are $(\lambda_{11}, \lambda_{12}, \ldots, \lambda_{1F})$ 221, $(\lambda_{21}, \lambda_{22}, \ldots, \lambda_{2F})$ at $(O_{F+1}, O_{F+2}, \ldots, O_{+2F})$ 222, ..., and $(\lambda_{W1}, \lambda_{W2}, \ldots, \lambda_{WF})$ at $(O_{(W-1)F+P}O_{(W-1)F+2}, \ldots, O_{2F})$ 223. By reversing the direction of flow of optical signals, the configuration of FIG. 2(a) becomes a sorting multiplexer. It should be pointed out that the configuration of FIG. 2(a) requires an alternate arrangement of positive and negative ΔL structures of the identical AWGs.

Figure 2B:
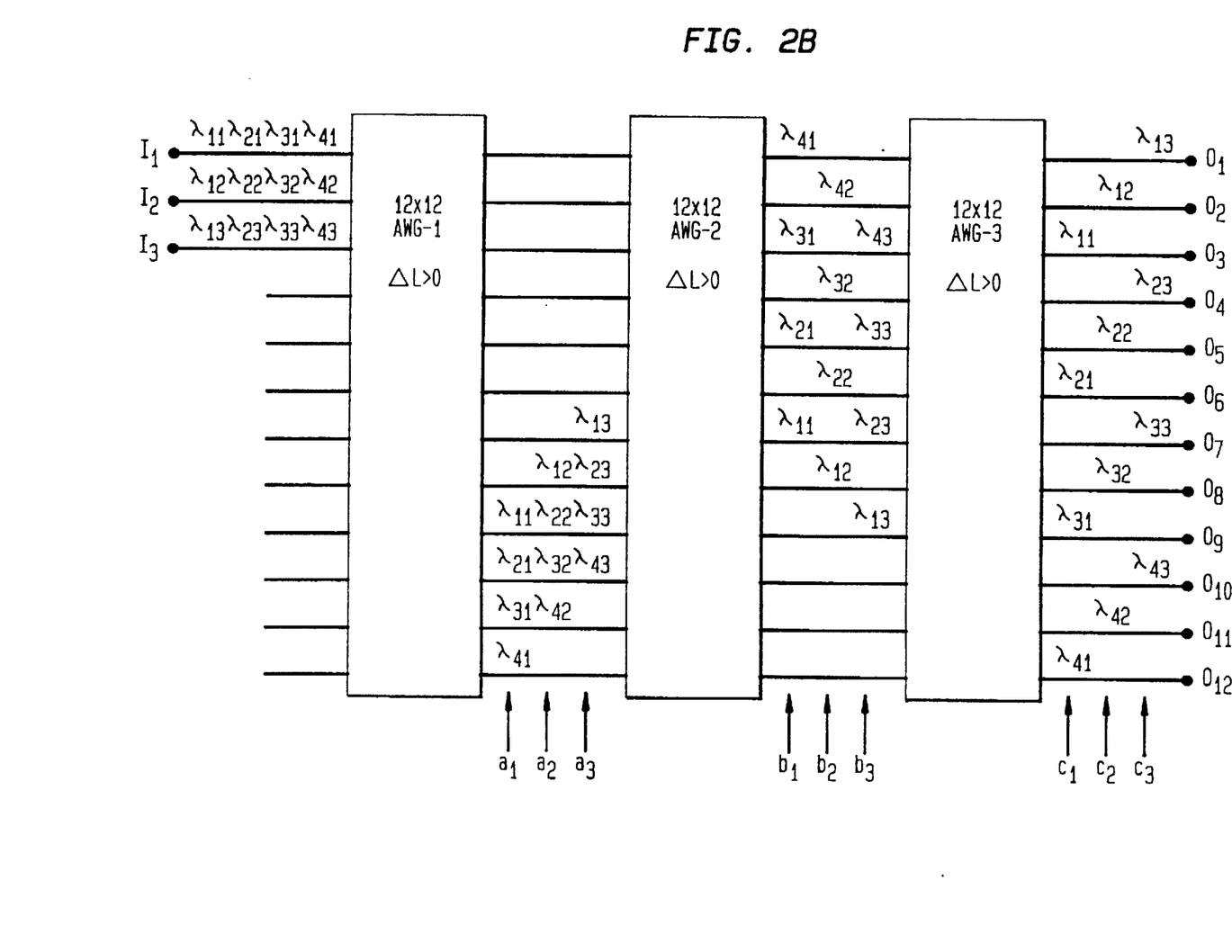
FIG. 2(b) schematically illustrates an example of the wavelength sorting using the cascade of three 12×12 arrayed-waveguide gratings.

An example of the sorting demultiplexer of the configuration FIG. 2(a) is illustrated by FIG. 2(b) for W=4 and F=3. Three 12×12 AWGs are cascaded with ΔL>0 for AWG-1 and AWG-3, and ΔL<0 for AWG-2 (AWG-2 is simply the structure of FIG. 1(a) reversed upside down). When $(\lambda_{11}, \lambda_{21}, \lambda_{31}, \lambda_{41})$ are launched into $I_1$, the AWG is designed to route $\lambda_{41}$ to the 12-th output of AWG-1, equation (1) with ΔL>0 indicates that $(\lambda_{11}, \lambda_{21}, \lambda_{31}, \lambda_{41})$ will exit AWG-1 as shown by the column $a_1$. After passing through AWG-2 with ΔL<0 (which is identical to AWG-1 but reversed upside down), $\lambda_{41}$ will exit at the first output. Applying equation (1) results in column $b_1$. AWG-3 with ΔL>0 then routes wavelength channels in $b_1$ to $c_1$. Similarly, $(\lambda_{12}, \lambda_{22}, \lambda_{32}, \lambda_{43})$ from $I_2$ will be routed to columns $a_2$, $b_2$, and $c_2$, while $(\lambda_{13}, \lambda_{23}, \lambda_{33}, \lambda_{41})$ from $I_3$ will be routed to columns $a_3$, $b_3$, and $c_3$. The function of sorting demultiplexer is clearly achieved.

Figure 3:
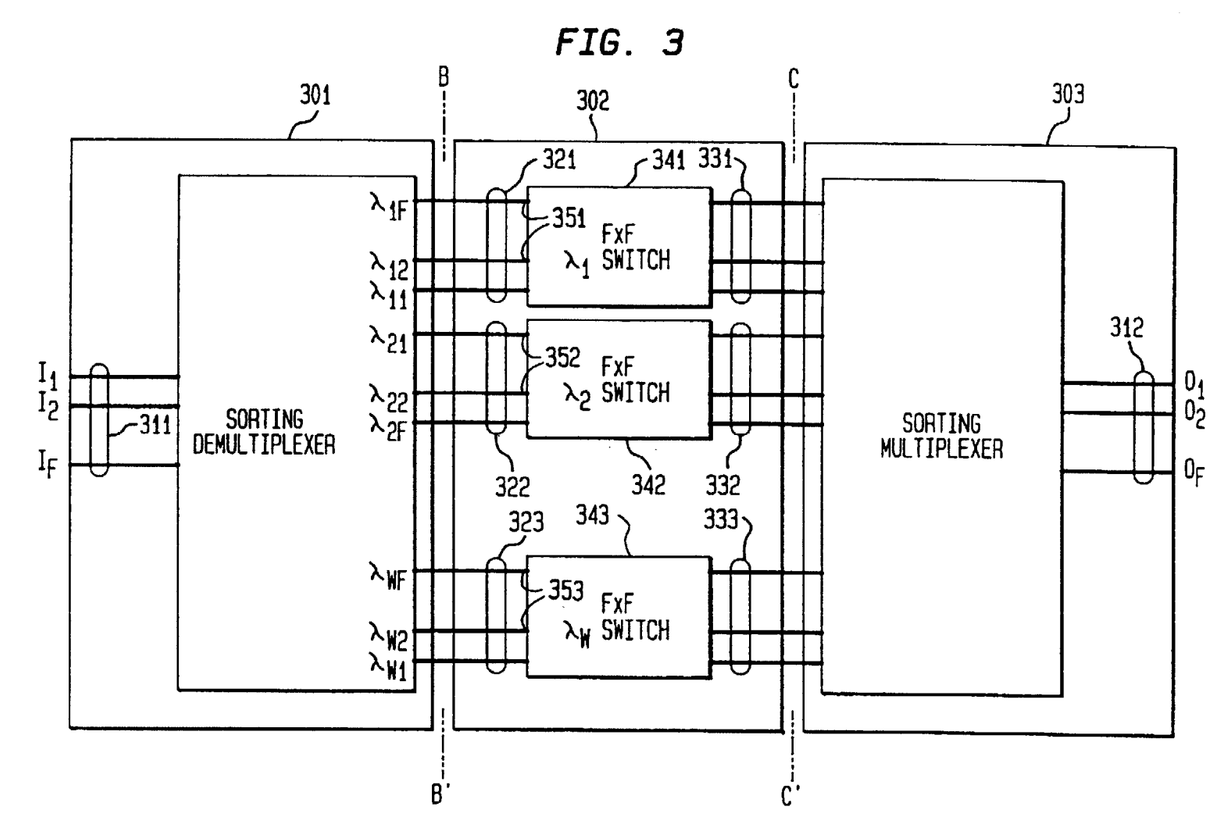
FIG. 3 illustrates a configuration of a planarized dynamic wavelength router comprising a sorting demultiplexer, an array of space switches, and a sorting multiplexer.

Using the wavelength sorting multi/demultiplexer of the present invention, a planarized dynamic wavelength router can be implemented as schematically illustrated by FIG. 3. The configuration comprises the input sorting demultiplexer 301, the intermediate switch array 302, and the output sorting multiplexer 303. For W selected wavelengths $(\lambda_1, \lambda_2, \ldots, \lambda_W)$, this system dynamically switches any $\lambda_k$ channel between inputs $(I_1, I_2, \lambda_F)$ 311 giving switched outputs at $(O_1, O_2, \ldots, O_F)$ 312. The sorting multi/demultiplexer 303 and 301 can be realized by the arrangement of either FIG. 1(b) or FIG. 2(a). The switch array 302 comprises W F×F space switches which are preferably integrated on one chip with the input and output waveguides arranged along lines B—B' and C—C', respectively. In general various types of switches (electro-optic, thermo-optic, mechanical etc.) can be employed for 302. At the output of sorting demultiplexer 301, the sorted $\lambda_1$ channels 321 are fed to the inputs 351 of $\lambda_1$-switch 341, $\lambda_2$ channels 322 to the inputs 352 of $\lambda_2$-switch 342, ..., and $\lambda_W$ channels 323 to the inputs 353 of $\lambda_W$-switch 343. Similarly, at the outputs of switch array 331, 332, ..., and 333, they are fed to the sorting multiplexer 303. An ideal implementation of FIG. 3 is to integrate the switch array 302 with the sorters 301 and 303. If they have to be fabricated separately due to for example size consideration, the preferred interconnecting scheme is to directly butt couple the chip 302 to the chips 301 and 303 along the lines B—B' and C—C' using packaging techniques with matched waveguide layouts on both sides. It is evident that the achieved wavelength sorting of the present invention completely eliminates on-chip waveguide crossing (or overlapping) from the input fibers at 311 to the inputs of switch array 351, 352, 353 and from the outputs of switch array 331, 332, 333 to the output fibers at 312.

Figure 4:
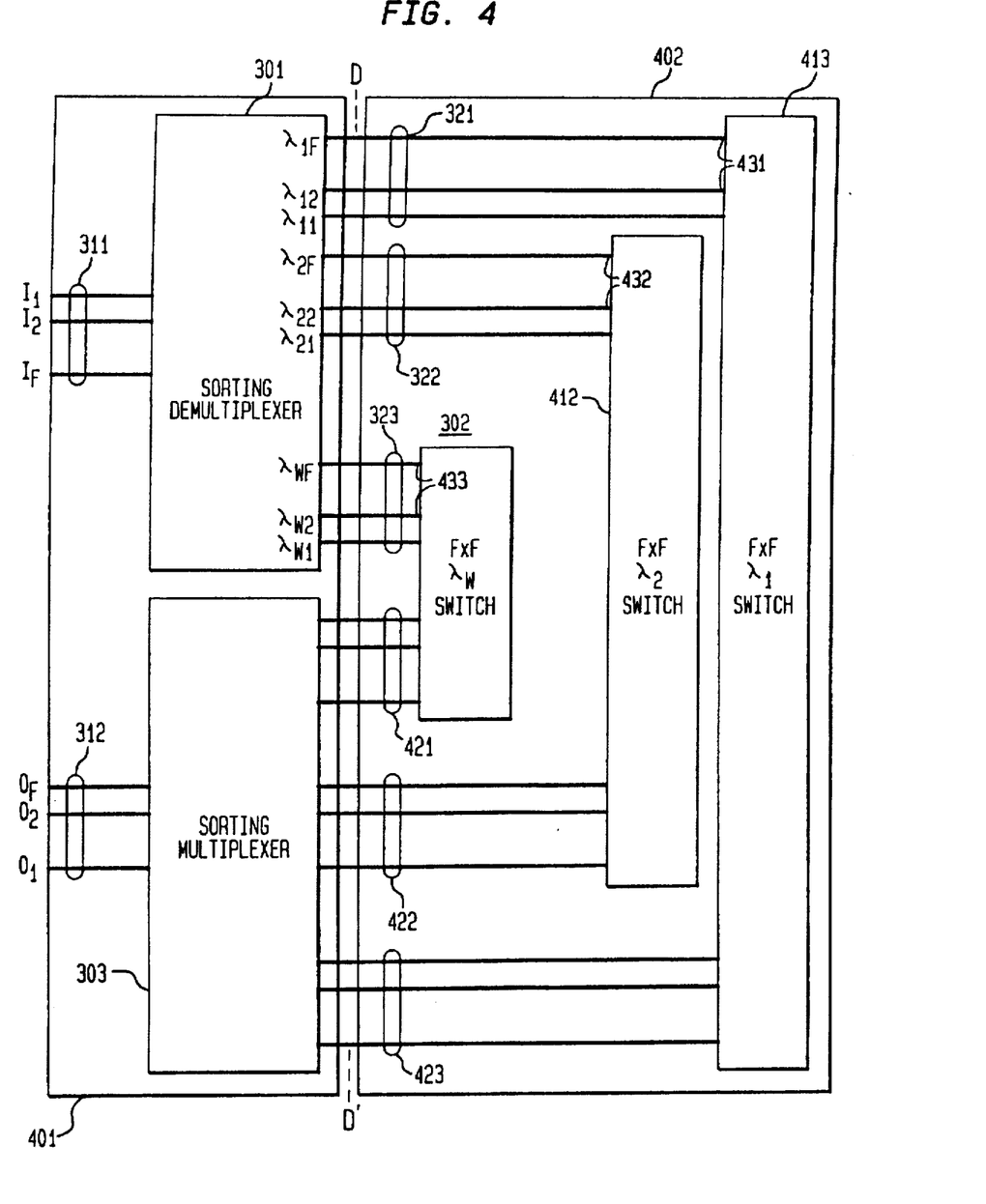
FIG. 4 illustrates an alternate configuration of the planarized dynamic wavelength router comprising an array of space switches and an integrated sorting mult/demultiplexer.

FIG. 4 schematically illustrates a second configuration of the planarized dynamic wavelength router incorporating wavelength sorting of the preferred embodiment. In this configuration, the sorting demultiplexer 301 and multiplexer 303 are integrated on one chip 401 while the switch array 302 is either also integrated on the same chip or on another 402. The sorted wavelength channels 321, 322, and 323 are fed to the inputs of switch array at 431, 432, and 433 with the connection done along the line D—D', while the outputs of switch array at 421, 422, and 433 are designed turning back and connected to the inputs of the sorting demultiplexer 303 along the same line D—D'. If the switch array is on another chip 402, the preferred interconnecting scheme is to directly butt couple the chips 402 and 401 along the line D—D' with matched waveguide layouts on both sides.

Figure 5:
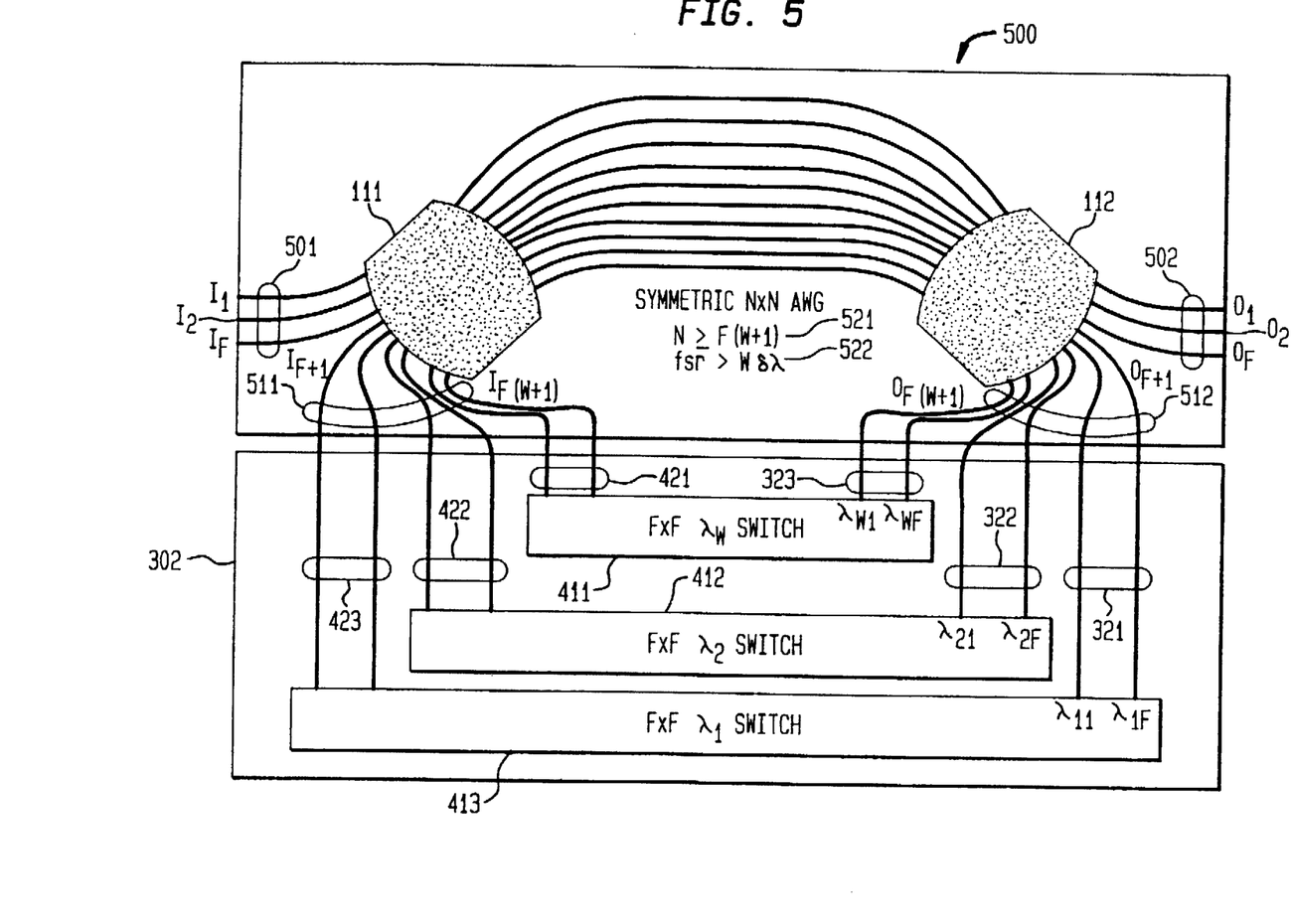
FIG. 5 illustrates another configuration of the planarized dynamic wavelength router comprising an array of space switches and an integrated sorting multi/demultiplexer implemented by a single array-waveguide grating.

The preferred embodiment of another configuration the planarized dynamic wavelength router incorporating wavelength sorting is illustrated in FIG. 5 where the sorting demultiplexer and the sorting multiplexer are implemented with a single N×N AWG with N≧F(W+1) 521. The selected W channel wavelengths have a spacing the same as in FIG. 1(b), i.e. $\delta\lambda = \lambda_{k+1} - \lambda_k = F\Delta\lambda$, and the AWG has its free spectral range fsr >W$\delta\lambda$ 522. When W wavelength channels are launched into each of the input waveguides $(I_1, I_2, \ldots, I_F)$ 501, the AWG can be designed, in the same principle as recited pertaining to FIG. 1(b), such that all wavelength channels will be routed to $(O_{F+1}, O_{F+2}, O_{F(W+1)})$ 512 in a sorted fashion. These sorted wavelength signals are fed into the inputs of the switch array at 321, 322, ..., and 323. The outputs of switch array at 421, 422, ..., and 423 are fed back to waveguides $(I_{F+1}, I_{F+2}, \ldots, I_{F(W+1)})$ 511. The symmetrically designed AWG 500 will multiplex them onto the outputs $(O_1, O_2, \ldots, O_F)$ 502, which completes the required function of dynamic wavelength routing. Again it is evident that the function of wavelength sorting of the present invention totally eliminates on-chip waveguide crossings (or overlapping) and removes the associated losses and crosstalks.

We claim:

1. A method of sorting a plurality of wavelength multiplexed channels using an arrayed-waveguide grating demultiplexer having a plurality of inputs and outputs, wherein F optical input streams contain said wavelength multiplexed channels, said method comprising:

selecting W wavelengths $\lambda_1, \lambda_2, \ldots, \lambda_W$ for said channels of each of said F optical input streams, with each of said F input streams using some or all of said W wavelengths, where said wavelengths are chosen such that $\lambda_{k+1} - \lambda_k = F \times \Delta\lambda$, where $\Delta\lambda$ is the device channel spacing of said arrayed-waveguide grating demultiplexer; and transmitting said F input streams, each of which uses some or all of said W wavelengths, onto F of said inputs of said arrayed-waveguide grating demultiplexer, where all signals of said channels having the same wavelength are sorted and transmitted on adjacent ones of said outputs of said arrayed-waveguide grating demultiplexer, and where F is an integer greater than one.

2. A method as recited in claim 1, wherein N is the number of said inputs and N is the number of said outputs, and wherein N>F×W to allow the number of said W wavelengths to be increased or to allow the number of said F input streams to be increased as more total channels are needed.

3. A method of multiplexing wavelength channels using an arrayed-waveguide grating multiplexer having a plurality of inputs and outputs, with F optical streams transmitted on F of said outputs of said arrayed-waveguide grating multiplexer, said method comprising:

selecting W wavelengths $\lambda_1, \lambda_2, \ldots, \lambda_W$ such that $\lambda_{k+1} - \lambda_k = F \times \Delta\lambda$, where $\Delta\lambda$ is the device channel spacing of said array-wavelength grating multiplexer; and transmitting signals of said wavelength channels on said inputs of said arrayed-waveguide grating multiplexer such that signals of said wavelength channels using the same wavelengths of said W wavelengths are on adjacent inputs of said inputs of said arrayed-waveguide grating multiplexer, where F optical streams are sorted and transmitted on F of said outputs of said multiplexer, where each of said streams on said F outputs has a plurality of wavelength multiplexed channels using some or all of said W wavelengths, with each channel of each said stream using only one of said W wavelengths, and where F is an integer greater than one.

4. A method as recited in claim 3, wherein N is the number of said inputs and N is the number of said outputs, and wherein N>F×W to allow the number of said W wavelengths to be increased or to allow the number of said F input streams to be increased as more total channels are needed.

5. An apparatus for demultiplexing F×W wavelength multiplexed channels on F inputs onto F×W outputs, where channels of the same wavelength are transmitted on adjacent ones of said F×W outputs, where W is the number of wavelengths used by said F×W channels, said apparatus comprising:

a plurality of arrayed-waveguide gratings AWG-1, AWG-2, ..., AWG-F cascaded with each other, each arrayed-waveguide grating AWG-j partially demultiplexing said wavelength multiplexed channels onto a progressively increasing number of outputs until said F×W multiplexed channels are demultiplexed onto F×W outputs of arrayed-waveguide grating AWG-F, where each of said arrayed-waveguide gratings has input and output waveguides which are non-overlapping and noncrossing, where those of said F×W channels having the same wavelengths are transmitted on said adjacent ones of said F×W outputs of arrayed-waveguide grating AWG-F, and where F is an integer greater than one.

6. An apparatus as recited in claim 5, wherein N is the number of said inputs and N is the number of said outputs, and wherein N>F×W to allow said apparatus to be used to demultiplex additional said multiplexed wavelength channels as needed.

7. An apparatus as recited in claim 5, wherein each of said arrayed-waveguide gratings is integrated on a separate integrated chip, and wherein, except for one of said arrayed-waveguide gratings AWG-1, input waveguides of each of said arrayed-waveguide gratings are butt coupled to output waveguides of another of said arrayed-waveguide gratings to form said cascade of arrayed-waveguide gratings.

8. An apparatus for multiplexing F×W wavelength channels on F×W inputs onto F outputs, where channels of the same wavelength are transmitted on adjacent ones of said F×W inputs, where W is the number of wavelengths used by said F×W channels, said apparatus comprising:

a plurality of arrayed-waveguide gratings AWG-1, AWG-2, ..., AWG-F cascaded with each other, each arrayed-waveguide grating AWG-j partially multiplexing said F×W channels onto a progressively decreasing number of outputs until said F×W channels are multiplexed onto said F outputs of arrayed-waveguide grating AWG-F, where each of said arrayed-waveguide gratings has input and output waveguides which are non-overlapping and non-crossing, where those of said F×W channels having the same wavelengths are transmitted on different F outputs of arrayed-waveguide grating AWG-F, and where F is an integer greater than one.

9. An apparatus as recited in claim 8, wherein N is the number of said inputs and N is the number of said outputs, and wherein N>F×W to allow said apparatus to be used to multiplex additional said wavelength channels as needed.

10. An apparatus as recited in claim 8, wherein each of said arrayed-waveguide gratings are integrated on a separate integrated chip, and wherein, except for one of said arrayed-waveguide gratings AWG-1, input waveguides of each of said arrayed-waveguide gratings are butt coupled to output waveguides of another of said arrayed-waveguide gratings to form said cascade of arrayed-waveguide gratings.

11. A dynamic wavelength router comprising:

an arrayed-waveguide grating demultiplexer having a plurality of input and output waveguides which are non-crossing and non-overlapping, said demultiplexer for receiving F optical streams on said input waveguides, each stream having at most W wavelength multiplexed channels of different wavelengths, said demultiplexer also for sorting wavelength channels of said F optical streams so that channels having the same wavelength appear on adjacent ones of said output waveguides of said demultiplexer;

an array of W optical space switches, each switch having a plurality of input and output waveguides which are non-crossing and non-overlapping, each of said switches receiving signals on only those of said wavelength channels having the same one of said W wavelengths, said array receiving at most said W wavelengths signals from said wavelength channels, each of said switches switching those of said wavelength channels from any one of its said input waveguides to any one of its said output waveguides, said array thus having said channels of the same wavelength adjacent to each other; and an arrayed-waveguide grating multiplexer having a plurality of input and output waveguides which are non-crossing and non-overlapping, said multiplexer for receiving said channels from said outputs of said array of switches and for multiplexing said outputs of said array of switches into F output streams, each output stream having at most W of said wavelength channels with at most said W different wavelengths, thereby routing any one of said channels from any one of said F optical input streams onto any one of said F output optical streams of said multiplexer, where F is an integer greater than one.

12. Apparatus as recited in claim 11, where said arrayed waveguide multiplexer and demultiplexer and said array of optical switches are integrated on a single chip.

13. A dynamic waveguide router, comprising:

a first integrated chip comprising an arrayed-waveguide grating demultiplexer having on said first chip a plurality of input and output waveguides which are non-crossing and non-overlapping, said demultiplexer for receiving F optical streams on said input waveguides, each stream having at most W wavelength multiplexed channels of different wavelengths, said demultiplexer also for sorting wavelength channels of said F optical streams so that channels having the same wavelength appear on adjacent ones of said output waveguides of said demultiplexer;

a second integrated chip comprising an array of W optical space switches, each switch having on said second chip a plurality of input and output waveguides which are non-crossing and non-overlapping, said input waveguides on said second chip being butt coupled to said output waveguides of said demultiplexer on said first chip, each of said switches receiving signals on only those of said wavelength channels using the same one of said W wavelengths, said array receiving at most said W wavelengths with signals from said wavelength channels, each said switch switching those of channels of said channels from any one of its said input waveguides to any one of its said output waveguides, said array thus having channels of the same wavelength adjacent to each other; and a third integrated chip having an arrayed-waveguide grating multiplexer having a plurality of input and output waveguides which are non-crossing and non-overlapping, said multiplexer for receiving said channels from said outputs of said array of switches and for multiplexing said outputs of said array of switches into F output streams, said input waveguides on said third chip being butt coupled to said output waveguides on said second chip, each output stream having at most W of said wavelength channels with at most said W different wavelengths, thereby routing any one of said wavelength channels from any one of said F optical input streams into any one of said F output optical streams of said multiplexer, where F is an integer greater than one.

14. An apparatus as recited in claim 13, wherein said first chip comprises a plurality of arrayed-waveguide gratings cascaded with each other.

15. An apparatus as recited in claim 13, wherein said third chip comprises a plurality of arrayed-waveguide gratings cascaded with each other.

16. A dynamic waveguide router, comprising:

a first integrated chip comprising a demultiplexer having on said first chip a plurality of input and output waveguides which are non-crossing and non-overlapping, said demultiplexer for receiving F optical streams on said input waveguides of said demultiplexer, each stream having at most W wavelength multiplexed channels of different wavelengths, said demultiplexer also for sorting said wavelength channels so that channels having the same wavelength appear on adjacent ones of said output waveguides of said demultiplexer, said first chip also comprising a multiplexer having on said first chip a plurality of input and output waveguides which are non-crossing and non-overlapping; and a second integrated chip comprising an array of W optical space switches, each switch having on said second chip a plurality of input and output waveguides which are non-crossing and non-overlapping, said input and output waveguides on said second chip being butt coupled to said output and input waveguides of said demultiplexer and multiplexer, respectively, on said first chip, each of said switches receiving signals on only those of said wavelength channels using the same one of said W wavelengths, said array receiving at most said W wavelengths with signals from said wavelength channels from said outputs of said demultiplexer on said first chip, each said switch switching channels from any one of its said input waveguides to any one if its said output waveguides, said array thus having channels of the same wavelength adjacent to each other.

said multiplexer on said first chip for receiving said wavelength channels from said outputs of said array of switches and for multiplexing said wavelength channels on said outputs of said array of switches into F output streams, each output stream having at most W channels with at most said W different wavelengths, thereby routing any one of said wavelength channels from any one of said F optical input streams into any one of said F output optical streams, where F is an integer greater than one.

17. An apparatus as recited in claim 16, wherein said demultiplexer and said multiplexer are implemented by using one and the same arrayed-waveguide grating.

18. An apparatus as recited in claim 16, wherein said demultiplexer comprises a first arrayed-waveguide grating, and wherein said multiplexer comprises a second arrayed-waveguide grating, said first and said second arrayed-waveguide gratings being separate gratings.

* * * * *